Inventor
C. L. JACKSON
By W. S. McDowell
Attorney

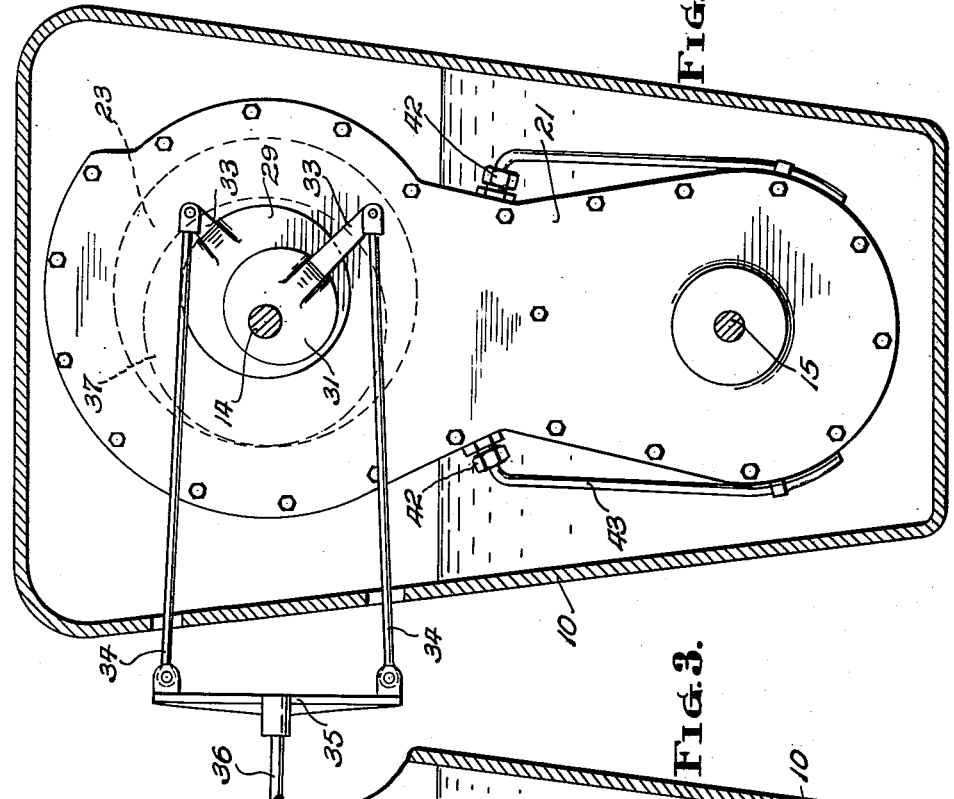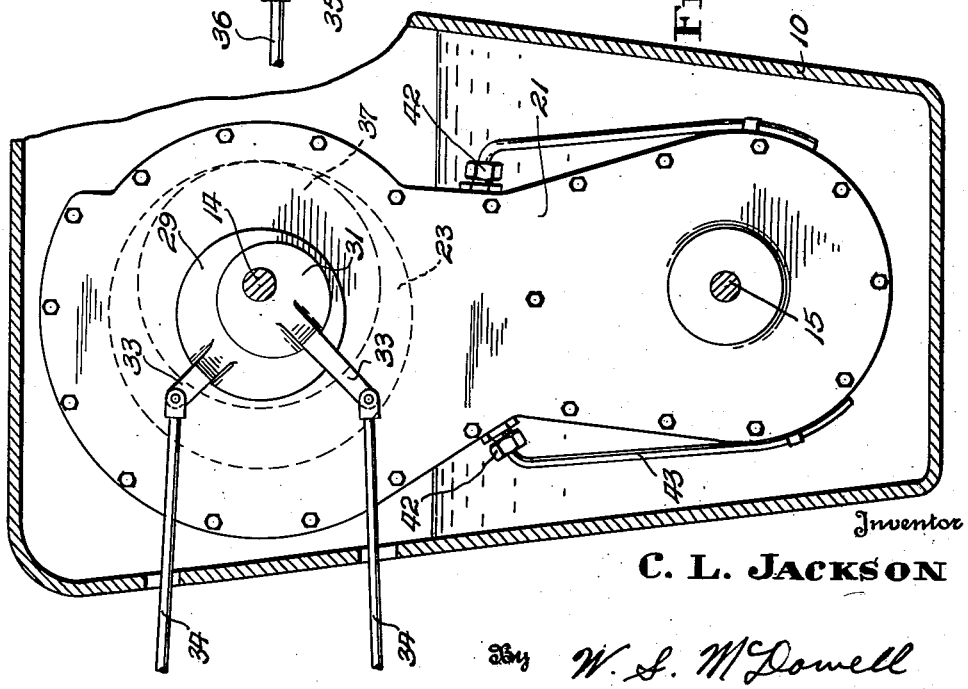

Oct. 18, 1949.                C. L. JACKSON                2,485,240
        REVERSIBLE VARIABLE SPEED ROTARY PUMP AND MOTOR
                       HYDRAULIC TRANSMISSION
Filed June 10, 1946                            3 Sheets-Sheet 3

Inventor

C. L. JACKSON

By W. S. McDowell

Attorney

Patented Oct. 18, 1949

2,485,240

UNITED STATES PATENT OFFICE 2,485,240

REVERSIBLE VARIABLE-SPEED ROTARY PUMP AND MOTOR HYDRAULIC TRANSMISSION

Carlton L. Jackson, Columbus, Ohio

Application June 10, 1946, Serial No. 675,804

6 Claims. (Cl. 60—53)

My invention relates to hydraulic power transmissions and, more particularly, to transmissions of the type capable of varying the ratio drive between a prime power source and a driven element.

It is the general object of my invention to provide an improved power transmission whereby the power output of a prime mover may be transferred to a driven element, by the medium of fluid pressure, in varying speeds from neutral, or no drive, to direct drive, and from neutral to full reverse drive and with varying ratios of speeds therebetween.

It is another object of my invention to provide a transmission of this type which embodies relatively few and structurally simple parts, and which is compact and occupies but little operational space.

For a further understanding of my invention, reference is made to the following description and the accompanying drawings, wherein:

Fig. 3 is a vertical sectional view taken along the line 3—3 of Fig. 2;

Fig. 4 is a similar view disclosing the device in its full reverse drive position;

Figure 2:
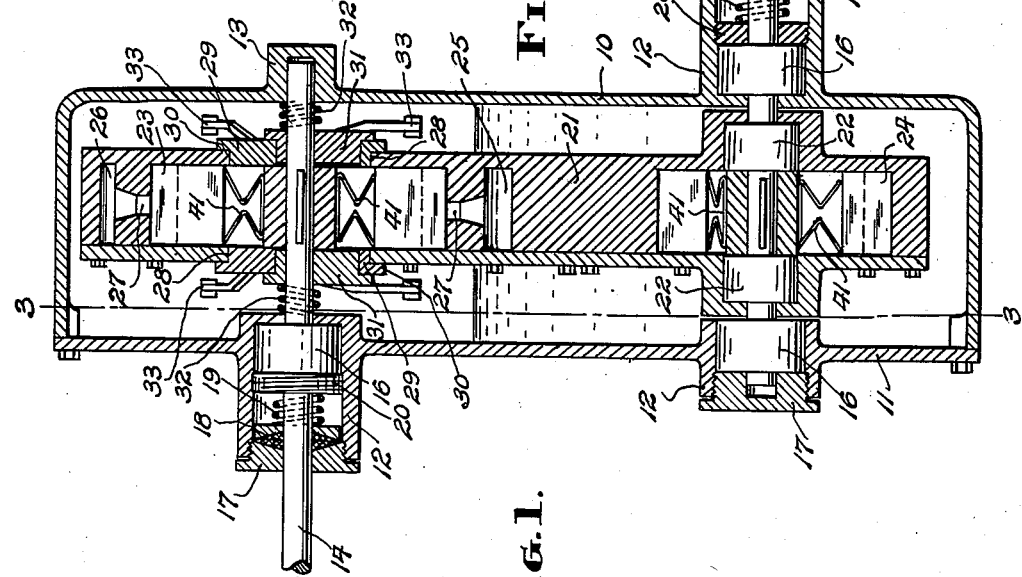
Fig. 2 is a longitudinal sectional view along the line 2—2 of Fig. 1.

With particular reference to the drawings, it will be seen that my improved hydraulic power transmitting mechanism embodies an outer housing 10 having a removable front plate 11. Both the housing and the front plate are formed with suitable bearing-receiving sleeves 12 and end bushings 13 which serve to align a drive shaft 14 and a radially offset driven shaft 15 which are supported for rotation by circular antifriction bearings 16 and extend internally of the housing.

The housing 10, besides acting as a supporting means for the shafts, serves as an hydraulic fluid reservoir, and consequently must be relatively fluid-tight. It will be noted that the sleeves 12 are all provided with threaded caps 17 and packing glands 18 so as to maintain the housing in a fluid-tight condition. Also, coil retention springs 19 are interposed between these glands 18 and threaded bearing-retaining collars 20 in order to maintain the glands in a fluid-tight condition regardless of wear. It will be noted that any suitable means may be employed in this respect to maintain the support of the shafts and, at the same time, afford a maximum protection against fluid leakage.

A casing 21 is positioned within the housing 10 and is supported for limited pivotal movement upon antifriction bearings 22 arranged about the lower driven shaft 15. The casing 21 is formed with upper and lower fluid chambers 23 and 24, respectively, these chambers being substantially circular in cross sectional configuration and communicating with one another by means of a pair of internal annular passages 25 and 26, respectively. These passages actually join the chambers at ports 27 formed in the walls of the chambers and disposed substantially opposite to one another.

The end walls of the casing 21 which enclose the upper fluid chamber 23 are formed with circular openings 28 which are disposed in axial relationship to the upper circular chamber 23. These openings receive a pair of circular collars 29 having substantially the external diameter of the openings, and formed with end flanges 30 so as to fit firmly within the openings 28 and against the end walls of the casing 21. The collars are also formed with offset bores which receive a second pair of similarly formed, but considerably smaller, collars 31 having offset bores which rotatably receive the drive shaft 14. The collars 29 and 31 are firmly held in position within the openings 28 of the casing by a pair of coil retention springs 32 disposed about the drive shaft 14 and between the outer housing 10 and the outer circular collars 31.

It should here be noted, that the distances which the center of the offset bores of the respective collars 29 and 31 occupy from the normal central axis of each collar are different, in order to permit the casing, and consequently its collar openings 28, to swing along a substantially arcuate path whose center lies approximately at the axis of the lower shaft 15. It will readily be seen, that to accomplish pivotal movement of the casing 21 about the relatively stationary lower shaft 15, it is necessary that the centers of the openings 28 must move in the path of an arc whose radius is equal to the distance between the shafts 14 and 15; hence, the centers of the two outer collars 29 must move along such an arc. To effect such movement, the offset bores of the collars 29 are removed a greater distance from their true centers than are the offset bores of the inner collars 31; or in otherwords, the eccentricity of the outer collar 29 is greater than the eccentricity of the inner collar 31. Thus it will be seen that upon opposite and simultaneous rotation of the respective collars, the so-called node portions of the outer collars will move in an approximate arc which, upon proper arrangement of the inner and outer collars, is closely proportional or concentric to an arc whose radius is equal to the distance between the two shafts 14 and 15. Such movement is accomplished by the difference in degree of eccentricity of the inner and outer collars; were it not for such differences, and if the degree of eccentricity of each collar was proportionally the same, the node portion of the outer collar would follow a substantially straight line path. Conversely, if no eccentricity existed with respect to the inner collars 31, and if the outer collars alone were eccentrically mounted, the path taken by the node portions or regions of the outer collars would describe a circle having a radius considerably less than the distance between the two shafts 14 and 15.

It will be noted that by arranging the collars in this manner with respect to the drive shaft, the collars constitute a pair of coacting cams. By rotating the collars simultaneously in opposite directions, the casing 21 which rides upon the outer collars may be pivotally rocked from one side to the other about the driven shaft 15, thus displacing the upper fluid chamber 23 with respect to the drive shaft 14.

Each of the collars 29 and 31 have rigidly attached actuation levers 33 which are pivotally linked with the inner ends of a like number of externally extending rods 34 introduced internally of the housing 10 through apertures formed in the walls thereof. These rods are pivotally linked at their outer ends with a cross-bar 35 which terminates in a single manually operable rod 36 which serves when laterally displaced to effect the ultimate pivotal movement of the upper portion of the casing 21.

Each of the fluid chambers 23 and 24 accommodate circular rotors 37 and 38, respectively, which are keyed to the drive shaft 14 and the driven shaft 15. The rotors mount a radial series of blades 39 within axially extending sockets 40 under compression of a like number of springs 41 retained within the sockets. The blades are at all times under force of the springs 41 which tend to force them outwardly into wiping engagement with the walls of the chambers.

Figure 1:
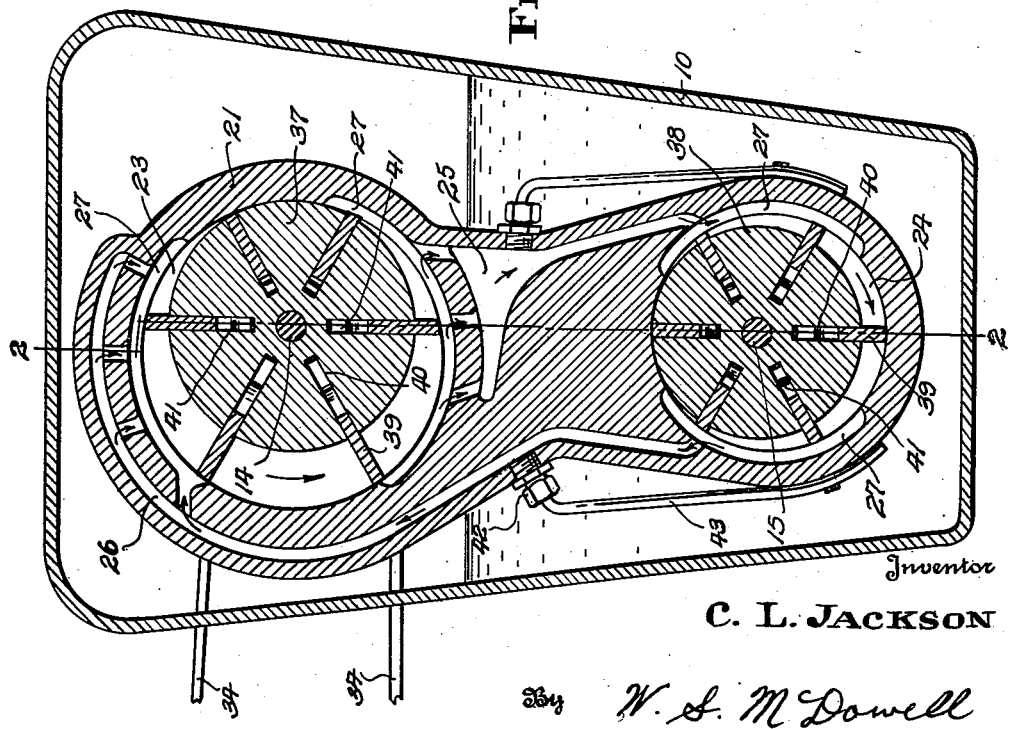
Fig. 1 is a transverse sectional view taken through a fluid transmission device formed in accordance with the present invention.
Figure 5:
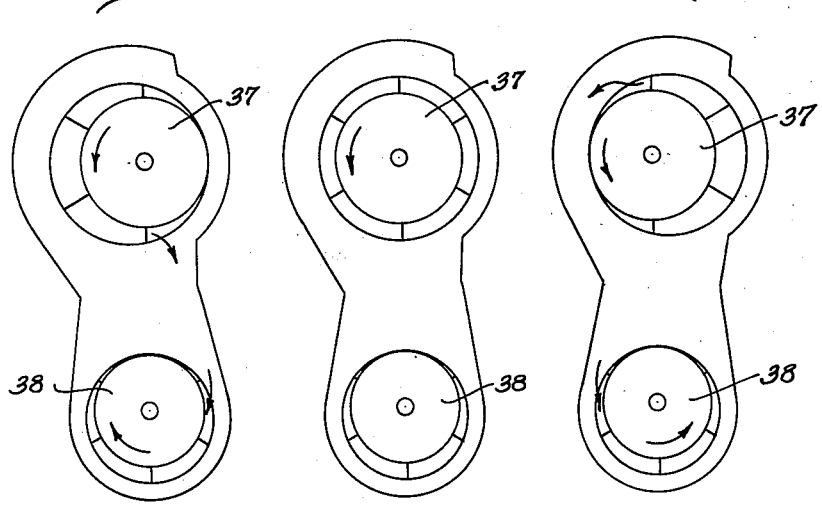
Fig. 5 is a diagrammatic view representing the device in its three prime positions, namely: full direct drive, neutral, and full reverse drive.
Figure 6:
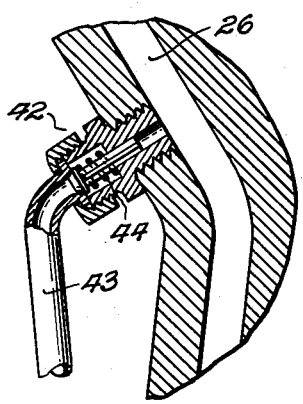
Fig. 6 is an enlarged vertical sectional view of one of the fluid intake valves.

As noted in Fig. 1 of the drawings, the location of the rotor 38 within the lower fluid chamber 24 is such that the peripheral edge of the rotor almost engages the upper arcuate segment of the chamber, thus the remaining volume of the chamber is concentrated in its lower arcuate position. It will be seen that as fluid is circulated downwardly through the passage 25 and upwardly through the passage 26, the lower rotor and the driven shaft will be rotated in a clockwise direction. Conversely, upon reversal of the circulation of fluid, the rotor will be driven in the opposite counterclockwise direction.

The direction and velocity of fluid flow through the passages 25 and 26 is controlled by position of the upper chamber 23 with respect to the drive rotor 37. Assuming the rotor is revolving constantly in a counterclockwise direction, and that both chambers and the connecting passages are filled with a suitable liquid, it will be seen that if the rotor 37 is positioned centrally with respect to the upper fluid chamber 23, the fluid therein will be freely circulated within the confines of the upper chamber 23 alone and no force will be exerted through the adjoining passages to the lower driven rotor 38. Consequently, no driving forces are transmitted through the mechanism. However, referring to Fig. 1, as the casing 21 is pivoted to the left about the driven shaft 15, the volume of fluid within the upper chamber 23 is concentrated to the left side and is circulated downwardly through the passage 25 and exerts a clockwise driving force upon the rotor 38. At the same time, fluid is circulating upwardly through the passage 26 from the lower chamber 24 to the upper chamber 23.

It will be manifest as the casing is moved to its extreme left hand position with respect to the rotor 37 which is denoted in Figs. 1 and 3, a direct drive between the two shafts 14 and 15 will be accomplished, whereas, in varying positions between center and extreme left of the casing, varying ratios of drive will ensue. It will also be manifest that by moving the casing to the right with respect to the rotor 37, as shown in Fig. 4, a reverse drive will be accomplished as the volume of fluid within the chamber 23 will be concentrated to the right of the rotor which will in turn circulate the fluid downwardly through the passage 26, instead of the passage 25, to cause a counterclockwise rotation of the driven shaft 15. As in positive drive, the ratio of reverse drive may be varied from neutral to full reverse drive depending upon the distance the casing is displaced to the right of the rotor 37.

To insure against inoperativeness of the mechanism due to loss of fluid within the chambers and passages, a pair of intake valves 42 are connected with the passages 25 and 26 in a manner so as to replenish the system with fluid in the event of leakage. The valves 42 are connected with conduits 43 which extend downwardly within the bottom of the housing 10 which acts as a hydraulic reservoir in which a quantity of the liquid fluid is retained, also any fluid leaking from the casing will flow into the reservoir. The valve in its normal position is held closed by spring tension and the pressure exerted by the circulating fluid within the passages. However, in the event of leakage, the consequent vacuum within the passages will unseat the valve and allow fluid to be sucked into the system until the same is again filled to capacity at which time the valve will again close under the compression of the spring 44.

In view of the foregoing, it will be seen that my invention provides a highly operable and structurally simple means for transmitting power, by the medium of fluid, to a driven element in varying ratios of positive and reverse drive whereby to effect a smooth and positive engagement between a power source and a driven element. It will be manifest that my invention eliminates the conventional gear transmissions and associated clutches employed in present day vehicles, and provides a compact mechanism which may be easily installed and maintained upon the ordinary automobile.

While the device disclosed in the accompanying drawings and the preceding description is a preferred form and practical adaptation of the present invention, it will be manifest that the same contemplates various modifications whereby the fluid volume within the chambers may be displaced by means other than the actual movement of the casing with respect to the drive shaft. For instance, the shaft and its associated rotor member may be moved with respect to the casing to provide volume displacement with the fluid chamber, and such modification would remain within the scope of the present invention and the following claims.

I claim:

1. An hydraulic power transmitting mechanism comprising a casing formed with a pair of longitudinally spaced and circular fluid-containing chambers, said casing being formed with a pair of independent fluid conducting passages joining said chambers, said passages communicating with the respective chambers at opposite sides thereof, a driving shaft extending within said casing through one of said chambers, a circular driving rotor carried by said driving shaft within one of said chambers, a plurality of radially and outwardly extending spring-pressed blades slidably carried by said rotor for wiping engagement with the walls of the chamber in which said driving rotor is positioned, a driven shaft extending within said casing and through the opposite chamber thereof, a driven rotor carried by said driven shaft for rotation about an axis disposed eccentrically of the opposite chamber of said casing, a plurality of radially and outwardly extending spring-pressed blades slidably carried by said driven rotor for wiping engagement with the walls of the chamber in which said driven rotor is positioned, a circular collar rotatably carried upon said driving shaft and mounted eccentrically thereon adjacent said casing, a second circular collar rotatably carried upon said first collar and mounted eccentrically thereon, said second collar extending through a circular opening formed in the walls of said casing adjacent the first named chamber, and means for imparting simultaneous and opposite limited rotation to said collars, said collars when so rotated serving to pivotally move said casing in a limited arcuate path about said driven shaft.

2. An hydraulic power-transmitting mechanism comprising a driving shaft, a driven shaft, a casing mounted on said driven shaft for limited pivotal swinging movement about the axis of said driven shaft, said casing being formed with a pair of longitudinally spaced circular fluid-containing chambers and a pair of independent fluid passages communicating with the chambers on opposite sides thereof, said casing being formed with a relatively enlarged opening adjacent one of the fluid-containing chambers for the reception of said driving shaft, a driving fluid displacing rotor carried by said driving shaft for rotation within one of the chambers of said casing, a driven fluid-displacing rotor carried by said driven shaft for rotation within the other of the chambers of said casing, a circular collar mounted eccentrically on said driving shaft adjacent the circular shaft-receiving opening of said casing for free rotational movement thereon, a second circular collar eccentrically mounted on said first-named collar for rotation thereon, said second collar being positioned within the circular opening formed in said casing in close-fitting engagement with the walls thereof, and means for effecting the simultaneous and opposite rotation of said collars, said collars when so rotated serving to pivotally move said casing in a limited arc about said driven shaft, whereby to cause relative movement between said driving rotor and the chamber of said casing in which it is contained.

3. An hydraulic power transmitting mechanism comprising a driving shaft, a driven shaft disposed in parallel and offset disposition with respect to said driving shaft, a casing mounted on said driven shaft for limited pivotal movement in a substantially perpendicular plane, said casing being formed with a relatively enlarged circular opening for the loose passage therethrough of said driving shaft and a pair of longitudinally spaced circular fluid-containing chambers, the chambers of said casing being joined by a pair of independent fluid-conducting passages communicating with the respective chambers at opposite sides thereof, fluid-circulating rotors occupying the respective chambers of said casings and carried respectively by said driving and driven shafts for rotation within the chambers, the rotor carried by said driven shaft being disposed eccentrically of the chamber in which it is positioned, a circular collar eccentrically and rotatably mounted on said driving shaft and extending within the circular opening of said casing, a second circular collar rotatably and eccentrically mounted on said first-named collar and disposed in close-fitting engagement with the walls of said casing defining the circular opening formed therein, and control means joined with each of said collars and operable to impart simultaneous and opposite rotation thereto, said collars when so rotated serving to impart limited pivotal movement to said casing whereby to vary the relative position of the rotor carried by said driving shaft within the chamber of said casing in which it is positioned.

4. An hydraulic power transmitting mechanism comprising a driving shaft, a driven shaft, a casing mounted on said driven shaft for limited pivotal movement in a substantially perpendicular plane, said casing being formed with a circular opening disposed in longitudinally spaced relation to said driven shaft for the loose reception of said driving shaft, said casing being formed adjacent the shaft-receiving portions thereof with a pair of internal circular fluid-containing chambers and a pair of independent fluid-conducting passages joining the chambers at opposite sides thereof, fluid-displacing rotors positioned for rotation within each of the chambers of said casing and carried respectively by said driving and and driven shafts, the rotor carried by said driven shaft being disposed eccentrically of the chamber in which it is positioned, and means rotatably carried upon said driving shaft and rotatably positioned within the circular opening of said casing for imparting limited pivotal movement to said casing about said driven shaft, whereby to vary the relative positions of the rotor carried by said driving shaft with respect to the chamber of said casing in which it is positioned.

5. In an hydraulic power transmitting mechanism comprising a casing formed with a pair of communicating fluid-containing chambers, a driving shaft extending through one of the chambers of said casing, a driven shaft extending through the other of the chambers, and a pair of fluid-displacing rotors carried by the respective shafts within the respective chambers of said casing for circulating fluid between the two chambers of said casing; a pair of circular and eccentrically arranged collars rotatably carried between said driving shaft and said casing and operable upon simultaneous and opposite rotational movement to shift said casing in a limited arcuate path relative to said driving shaft, whereby to vary the relative position of the rotor carried by said driving shaft with respect to the chamber of said casing in which it is positioned.

6. In an hydraulic power transmitting mechanism comprising a casing formed with a pair of communicating fluid-containing chambers, a driving shaft extending through one of the chambers of said casing, a driven shaft extending through the other of the chambers, and a pair of fluid-displacing rotors carried by the respective shafts within the respective chambers of said casing for circulating fluid between the two chambers of said casing; a pair of circular and eccentrically arranged collars rotatably carried between said driving shaft and said casing and operable upon simultaneous and opposite rotational movement to shift said casing in a limited arcuate path relative to said driving shaft, whereby to vary the relative position of the rotor carried by said driving shaft with respect to the chamber of said casing in which it is positioned, and means joined with said collars and extending externally of said casing for imparting simultaneous and opposite rotation to said collars.

CARLTON L. JACKSON.

REFERENCES CITED

The following references are of record in the file of this patent:

UNITED STATES PATENTS

| Number | Name | Date |
|---|---|---|
| 466,662 | Duncan | Jan. 5, 1892 |
| 2,173,855 | Orshansky | Sept. 26, 1939 |
| 2,227,631 | Carter | Jan. 7, 1941 |
| 2,309,148 | Wilson | Jan. 26, 1943 |
| 2,371,922 | Saito | Mar. 20, 1945 |